July 27, 1971  S. LABANA  3,595,687

DIVINYL COMPOUNDS FROM MONOEPOXIDES AND PAINTING PROCESS

Filed Aug. 4, 1969

SANTOKH S. LABANA
INVENTOR

BY John R. Faulkner
Olin B. Johnson
ATTORNEYS

United States Patent Office 3,595,687
Patented July 27, 1971

3,595,687
DIVINYL COMPOUNDS FROM MONOEPOXIDES AND PAINTING PROCESS
Santokh Labana, Dearborn Heights, Mich., assignor to Ford Motor Company, Dearborn, Mich.
Filed Aug. 4, 1969, Ser. No. 865,543
Int. Cl. B44d 1/50; C07c 69/52; C08f 1/24
U.S. Cl. 117—93.31                              21 Claims

ABSTRACT OF THE DISCLOSURE

A substrate is coated with a film-forming composition consisting essentially of vinyl monomers and a unique divinyl compound and the coating is converted to a tenaciously adhering, solvent-resistant, wear and weather-resistant coating by exposing the coated substrate to ionizing radiation, preferably in the form of an electron beam. This divinyl compound is formed by first reacting a monoepoxide with acrylic acid and methacrylic acid and subsequently reacting the resultant ester condensation product with a vinyl unsaturated acyl halide.

---

This invention relates to the art of coating. It is particularly concerned with the process of painting a substrate having external surfaces of wood, glass, or polymeric solid with a film-forming solution comprising unique divinyl compounds and monovinyl monomers and crosslinking such film-forming solution into a wear-resistant, weather-resistant, solvent-resistant, tenaciously adhering film by exposing the same to ionizing radiation, preferably in the form of an electron beam, and to the paint used in this process.

In this application, the term "paint" is meant to include pigment and/or finely ground filler, the binder without pigment and/or filler or having very little of the same, which can be tinted if desired. Thus, the paint binder which is ultimately crosslinked by ionizing radiation can be all or virtually all that is used to form the film, or it can be a vehicle for pigment and/or particulate filler material.

Figure 1:
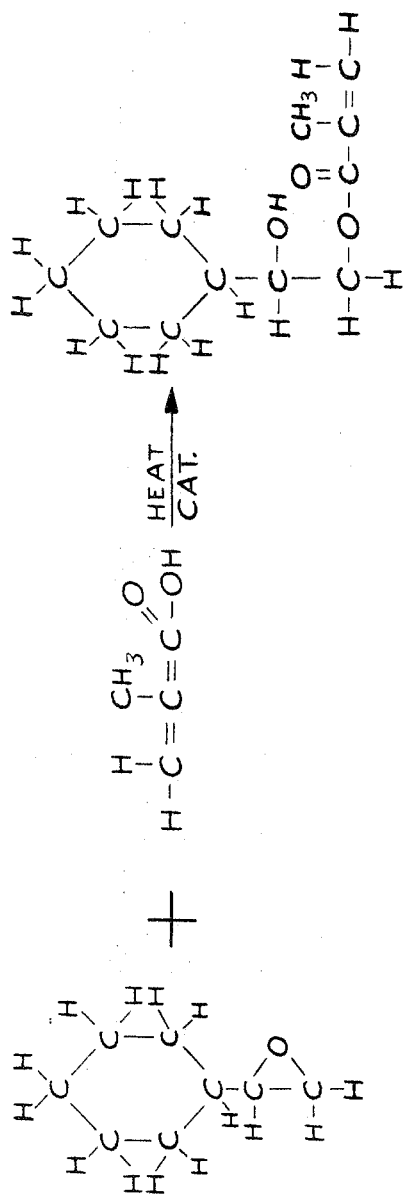
Figure 2:
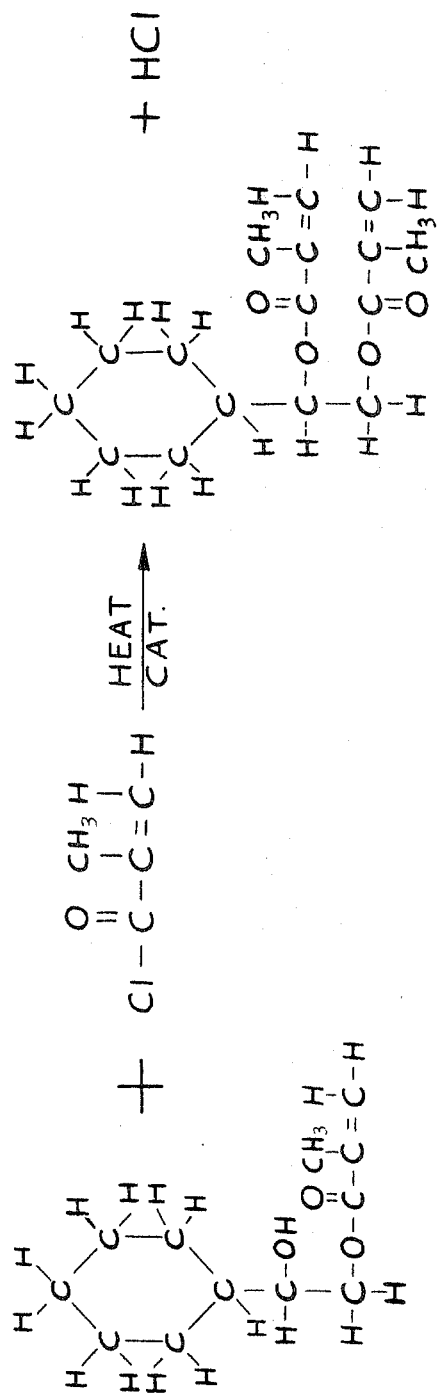

The first reaction step in preparing the divinyl compound used herein is illustrated by the representative reaction shown in FIG. 1 of the accompanying drawing, the second reaction step is illustrated by the representative reaction shown in FIG. 2.

The monoepoxides employed as starting materials for preparing the divinyl compounds of this invention contain 4 to 12 carbon atoms. In the preferred embodiment, the monoepoxide is a $C_7$ to $C_{10}$ monocyclic monoepoxide in accordance with the formula:

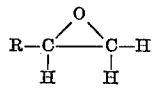

wherein R is an aryl, alkylaryl, arylalkyl, aryloxy, cycloaliphatic or heterocyclic radical, e.g., phenyl glycidyl ether, vinyl cyclohexene epoxide, vinyl cyclopentent epoxide, styrene epoxide, vinyl toluene epoxide, and vinyl pyridyl epoxide. In a second embodiment, the monoepoxide is a $C_5$–$C_6$ monocyclic monoepoxide wherein the epoxide group is attached to carbon atoms of the cyclic structure, i.e., cyclohexene epoxide and cyclopentene epoxide. In a third embodiment, the monoepoxide is a $C_4$–$C_{12}$ acyclic monoepoxide, e.g., 1-butene epoxide, 1-hexene epoxide, and 1-dodecene epoxide.

The monoepoxides of the preferred embodiment have molecular weights in the range of about 112 to about 151, the monoepoxide of the second embodiment have molecular weights of about 74 to about 98. The monoepoxides of the third embodiment have molecular weights in the range of about 72 to about 184.

The vinyl unsaturated acyl halides are preferably acryloyl chloride and/or methacryloyl chloride but others may be used, e.g., the corresponding bromides.

The dinviyl compounds prepared by this method are homopolymerizable and copolymerizable with monovinyl monomers, e.g., styrene, vinyl toluene, alpha-methyl styrene, methyl methacrylate, ethyl acrylate, butyl acrylate, butyl methacrylate, hydroxypropyl methacrylate, glycidyl methacrylate, 2-ethylhexylacrylate, etc., divinyl monomers such as divinyl benzene, the divinyl reaction product formed by reacting a diepoxide with two molar parts of acrylic acid or methacrylic acid, the divinyl product formed by reacting a diepoxide with two molar parts of acrylic acid or methacrylic acid and subsequently reacting the resultant ester condensation product with two molar parts of a saturated acyl halide, e.g., acetyl chloride, butyric acid chloride, hexanoic acid chloride, capric acid chloride, stearic acid chloride, or an effectively saturated acyl halide, e.g., benzoyl chloride, the divinyl reaction product formed by reacting one molar part of a diepoxide with two molar parts of an acrylic or methacrylic acid and subsequently reacting the resultant ester condensation product with two molar parts of an alpha-beta olefinically unsaturated acyl halide having an aromatic radical affixed to the beta carbon of the olefinic linkage, e.g., cinnamic acid chloride, a tetravinyl reaction product formed by reacting one molar part of a diepoxide with two molar parts of acrylic or methacrylic acid and subsequently reacting the resultant ester condensation product with two molar parts of a vinyl unsaturated acyl halide, alpha-beta olefinically unsaturaed polymers, etc.

The divinyl adducts used herein have lower viscosities than their corresponding monovinyl compounds produced by reacting one mole of acrylic or methacrylic acid with a monoepoxide. They have increased solubility in organic solvents and are more sensitive to ionizing radiation than such monovinyl compounds.

In the method of this invention, the paint binder consists essentially of about 10 to about 80, preferably about 20 to about 60, parts by weight of the divinyl compound and about 20 to about 90, preferably about 40 to about 80, parts by weight monovinyl monomers. A minor proportion, i.e., up to slightly below about 50 weight percent of the divinyl compound may be replaced with a tetravinyl compound or a different divinyl compound consisting essentially of carbon, hydrogen and oxygen and having a molecular weight below about 2,600, preferably in the range of about 220 to about 1,100, more preferably in the range of about 220 to about 650. Such divinyl and tetravinyl compounds are hereinbefore mentioned and hereinafter illustrated.

The films formed from the paints of this invention are advantageously cured at relatively low temperatures, e.g., between about 20° and about 70° C. The radiation energy is applied at dose rates of about 0.1 to about 100 mrad per second upon a preferably moving workpiece until the wet film is converted to a tack-free state or until the film is exposed to a desired dosage.

The film-forming material advisedly has an application viscosity low enough to permit rapid application to the substrate and substantially even depth and high enough so that at least one mil (0.001 inch) film will hold upon a vertical surface without sagging. Such films will ordinarily be applied to an average depth of about 0.1 to about 4 mils with the appropriate adjustment in viscosity and application techniques. It will be obvious to those skilled in the art that the choice of polymerizable components can be varied so as to vary the viscosity of the paint binder. Likewise, viscosity can also be adjusted by the addition of nonpolymerizable, volatile solvents, e.g., toluene, xylene, etc., which can be flashed off after application. By one or more of such adjustments, the viscosity of the paint binder solution can be adapted for application by conventional paint application techniques, e.g., spraying, roll coating, etc. The paint binder is preferably applied to the substrate and cured thereon as a continuous film of substantially even depth.

This invention will be more fully understood from the following illustrative examples:

EXAMPLE 1

A divinyl compound is prepared in the manner below set forth from the materials hereinafter named:

(1) to a reaction vessel equipped with a condenser, stirrer, nitrogen inlet and thermometer are charged the following materials:

| Materials: | Parts by weight |
| --- | --- |
| (a) Vinyl cyclohexene epoxide | 126 |
| (b) Methacrylic acid | 85 |
| (c) Toluene (solvent) | 500 |
| (d) Dimethylbenzylamine (catalyst) | 2 |

(2) The vinyl cyclohexene epoxide, the methacrylic acid and the dimethylbenzylamine are intimately mixed and incrementally added to the toluene which is at 90° C. in a nitrogen atmosphere.

(3) The reaction mixture is maintained at 90° C. until reaction of the epoxide groups is essentially complete as measured by product acid number of less than about 10.

(4) The solvent is removed under vacuum.

(5) The reaction product of (4) in the amount of 210 parts by weight is dissolved in 500 parts by weight of toluene and 95 parts by weight of methacryloyl chloride are added dropwise with the reaction mixture maintained at 65° C. until HCl evolution ceases.

(6) The solvent is removed under vacuum and the divinyl compound is recovered.

Substrates of wood, glass, metal and polymeric solid, i.e., polypropylene and acrylonitrile-butadiene-styrene copolymer, are coated with a paint binder composition of this divinyl compound and monovinyl monomers using the following procedure:

(1) A solution is prepared from 10 parts by weight of this divinyl compound and 90 parts by weight of an equimolar mix of methyl methacrylate, butyl acrylate and 2-ethylhexyl methacrylate. This solution is sprayed on the before mentioned substrates to an average depth of about 1 mil (0.001 inch). The coated substrate is passed through a nitrogen atmosphere and at a distance of about 10 inches below the electron emission window of a cathode ray type, electron accelerator through which an electron beam is projected upon the coated surface until the wet coating is polymerized to a tack-free state. The electrons of this beam have an average energy of about 275,000 electron volts with a current of about 25 milliamperes.

(2) A second group of substrates are coated in the manner above set forth using the same conditions and materials except for the single difference that the paint binder solution used consists of about 20 parts by weight of the divinyl compound and about 80 parts by weight of an equimolar mix of methyl methacrylate and styrene and the coating material is applied to an average depth of about 3 mils.

(3) A third group of substrates are coated in the manner above set forth using the same conditions and materials except for the single difference that the paint binder solution used consists of about 80 parts by weight of the divinyl compound and 20 parts by weight of methyl methacrylate and is reduced to the desired spraying consistency with acetone. The acetone is permitted to flash off after application and prior to irradiation.

A fourth group of substrates are coated in the manner above set forth using the same conditions and materials except for the sole difference that the paint binder solution used consists of 60 parts by weight of the divinyl compound and 40 parts by weight of a mix of methyl methacrylate, ethyl acrylate and butyl methacrylate.

EXAMPLE 2

The procedure of Example 1 is repeated with the sole difference that the electrons of the electron beam have an average energy of about 350,000 electron volts.

EXAMPLE 3

The procedure of Example 1 is repeated with the sole difference that the atmosphere of irradiation is helium.

EXAMPLE 4

The procedure of Example 1 is repeated with the sole difference that acryloyl chloride is substituted for the methacryloyl chloride.

EXAMPLE 5

The procedure of Example 1 is repeated with the sole difference that methylcryloyl bromide is used in lieu of the methacryloyl chloride.

EXAMPLE 6

The procedure of Example 1 is repeated with the sole difference that acryloyl bromide is substituted for the methacryloyl chloride.

EXAMPLE 7

A divinyl compound is prepared as in Example 1 and a tetravinyl compound is prepared using the same procedure by reacting one molar part of 3,4-epoxy-6-methylcyclohexylmethyl - 3,4 - epoxy - methylcyclohexanecarboxylate with 2 molar parts of methacrylic acid and then reacting the resultant divinyl ester condensation product with two molar parts of methacryloyl chloride. Substrates are then coated as in Example 1 with the sole difference that in the paint binder solution 49 weight percent of the divinyl compound is replaced with an equal amount by weight of the tetravinyl compound.

Additional substrates are coated in like manner except that in the paint binder solution 1 weight percent of the divinyl compound is replaced with an equal amount by weight of the tetravinyl compound.

Additional substrates are coated in like manner except that in the paint binder solution 25 weight percent of the divinyl compound is replaced with an equal amount by weight of the tetravinyl compound.

EXAMPLE 8

A divinyl compound is prepared as in Example 1 and a different divinyl compound is prepared using the same procedure and reacting a diepoxide, 1-epoxyethyl 3,4-epoxycyclohexane, with two molar parts of acrylic acid and then reacting the resultant divinyl ester condensation product with two molar parts of butyric acid chloride. Substrates are then coated as in Example 1 with the sole difference that in the paint binder solution 49 weight percent of the divinyl compound prepared from the monoepoxide is replaced with an equal amount by weight of the divinyl compound prepared from the diepoxide.

Additional substrates are coated in like manner except that in the paint binder solution one weight percent of the divinyl compound prepared from the monoepoxide is replaced with an equal amount by weight of the divinyl compound prepared from the diepoxide.

Additional substrates are coated in like manner except that in the paint binder solution 25 weight percent of the divinyl compound prepared from the monoepoxide is replaced with an equal amount by weight of the divinyl compound prepared from the diepoxide.

EXAMPLE 9

A divinyl compound is prepared as in Example 1 and a different divinyl compound is prepared using the same procedure by reacting dicyclopentadienedioxide with two molar amounts of methacrylic acid and then reacting the resultant divinyl ester condensation product with two molar amounts of cinnamic acid chloride. Substrates are then coated as in Example 1 with the sole difference that in successive operations 49 weight percent, 1 weight percent and 25 weight percent of the divinyl compound prepared from the monoepoxide is replaced with a corresponding amount by weight of the divinyl compound prepared from the diepoxide.

EXAMPLE 10

Example 9 is repeated except that benzoyl chloride is substituted for cinnamic acid chloride.

EXAMPLE 11

Example 1 is repeated except that vinyl cyclohexene epoxide is substituted for the phenyl glycidyl ether.

EXAMPLE 12

The procedure of Example 1 is repeated except that vinyl-cyclopentene is substituted for the phenyl glycidyl ether.

EXAMPLE 13

The procedure of Example 1 is repeated except that styrene epoxide is substituted for the phenyl glycidyl ether.

EXAMPLE 14

The procedure of Example 1 is repeated except that vinyl toluene epoxide is substituted for the phenyl glycidyl ether.

EXAMPLE 15

The procedure of Example 1 is repeated except that vinyl pyridyl epoxide is substituted for the phenyl glycidyl ether.

EXAMPLE 16

The procedure of Example 1 is repeated except that cyclohexene epoxide is substituted for the phenyl glycidyl ether.

EXAMPLE 17

The procedure of Example 1 is repeated except that cyclopentene epoxide is substituted for the phenyl glycidyl ether.

EXAMPLE 18

The procedure of Example 1 is repeated except that 1-butene epoxide is substituted for the phenyl glycidyl ether.

EXAMPLE 19

The procedure of Example 1 is repeated except that 1-hexene epoxide is substituted for the phenyl glycidyl ether.

EXAMPLE 20

The procedure of Example 1 is repeated except that 1-dodecene epoxide is substituted for the phenyl glycidyl ether.

The term "ionizing radiation" as employed herein means radiation having sufficient energy to effect polymerization of the paint films herein disclosed, i.e., energy equivalent to that of about 5,000 electron volts or greater. The preferred method of curing films of the instant paints upon substrates to which they have been applied is by subjecting such films to a beam of polymerization effecting electrons having an average weight in the range of about 100,000 to about 500,000 electron volts. When using such a beam, it is preferred to employ a minimum of 25,000 electron volts per inch of distance between the radiation emitter and the workpiece when the intervening space is occupied by air. Adjustment can be made for the relative resistance of the intervening gas which is preferably an oxygen-free inert gas such as nitrogen or helium. We prefer to employ an electron beam which as a source of emission has average energy in the range of about 100,000 to about 500,000 electron volts.

The abbreviation "rad" as employed herein means that dose of radiation which results in the absorption of 100 ergs. of energy per gram of absorber, e.g., coating film. The abbreviation "mrad" as employed herein means 1 million rad. The electron emitting means may be a linear electronic accelerator capable of producing a direct potential in the range of about 100,000 to about 500,000 volts. In such a device, electrons are ordinarily emitted from a hot filament and accelerated through a uniform voltage gradient. The electron beam, which may be about ⅛ inch in diameter at this point, may then be scanned to make a fan-shaped beam and then passed through a metal window, e.g., a magnesium-thorium alloy, aluminum, an alloy of aluminum and a minor amount of copper, etc., of about 0.003 inch thickness.

It will be understood by those skilled in the art that modifications can be made within the foregoing examples without departing from the spirit and scope of the invention as set forth in the following claims.

I claim:

1. A paint polymerizable by ionizing radiation which, exclusive of nonpolymerizable solvents, pigments and particulate mineral filler, consists essentially of about 20 to about 90 parts by weight monovinyl monomers and about 10 to about 80 parts by weight of a divinyl compound formed by first reacting one molar part of a monoepoxide with one molar part of an alpha-beta olefinically unsaturated monocarboxylic acid selected from acrylic acid and methacrylic acid and subsequently reacting the monovinyl ester condensation product with one molar part of a vinyl unsaturated halide.

2. A paint in accordance with claim 1 wherein said monoepoxide is a $C_7$–$C_{10}$ monocyclic monoepoxide in accordance with the formula

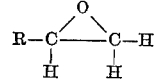

wherein R is an aryl, alkyl aryl, arylalkyl, aryloxy, cycloaliphatic or heterocyclic radical.

3. A paint in accordance with claim 1 wherein said monoepoxide is selected from a member of the group consisting of cyclohexene epoxide and cyclopentene epoxide.

4. A paint in accordance with claim 1 wherein said monoepoxide is a $C_4$–$C_{12}$ acyclic, aliphatic alpha-beta monoepoxide.

5. A paint in accordance with claim 1 wherein said acyl halide is the chloride of acrylic or methacrylic acid.

6. A paint in accordance with claim 1 wherein said acyl halide is the bromide of acrylic or methacrylic acid.

7. A paint in accordance with claim 1 wherein an amount up to but less than 50% of said divinyl compound is replaced with a tetravinyl compound consisting essentially of carbon, hydrogen and oxygen and having a molecular weight below about 2,600.

8. A paint in accordance with claim 1 wherein an amount up to but less than 50% of said divinyl compound is replaced with a divinyl compound consisting essentially of carbon, hydrogen and oxygen, having a molecular weight below about 2,600, and being formed by reacting a diepoxide with two molar equivalents of an alpha-beta olefinically unsaturated monocarboxylic acid selected from acrylic acid and methacrylic acid and subsequently reacting the resultant divinyl ester condensation product with two molar parts of a saturated acyl halide.

9. A paint polymerizable by ionizing radiation which, exclusive of nonpolymerizable solvents, pigments and particulate mineral filler, consists essentially of about 40 to about 80 parts by weight monovinyl monomers and about 20 to about 60 parts by weight of a divinyl compound formed by first reacting one molar part of a monoepoxide with one molar part of an alpha-beta olefinically unsaturated monocarboxylic acid selected from acrylic acid and methacrylic acid and subsequently reacting the resultant monovinyl ester condensation product with one molar part of a vinyl unsaturated acyl halide.

10. A paint in accordance with claim 9 wherein said monoepoxide is phenyl glycidyl ether.

11. A paint in accordance with claim 9 wherein said monoepoxide is vinyl cyclohexene epoxide.

12. A paint in accordance with claim 9 wherein said monoepoxide is vinyl cyclopentene epoxide.

13. A paint in accordance with claim 9 wherein said monoepoxide is styrene epoxide.

14. A paint in accordance with claim 9 wherein said monoepoxide is vinyl toluene.

15. A paint in accordance with claim 9 wherein said monoepoxide is vinyl pyridyl epoxide.

16. A paint in accordance with claim 9 wherein an amount up to but less than 50% of said divinyl compound is replaced with a tetravinyl compound consisting essentially of carbon, hydrogen and oxygen and having a molecular weight in the range of about 220 to about 1100.

17. A paint in accordance with claim 9 wherein an amount up to but less than 50% of divinyl compound is replaced with a tetravinyl compound consisting essentially of carbon, hydrogen and oxygen and having a molecular weight in the range of about 220 to about 650.

18. A paint in accordance with claim 9 wherein an amount up to but less than 50% of said divinyl compound is replaced with a different divinyl compound consisting essentially of carbon, hydrogen and oxygen, having a molecular weight in the range of about 220 to about 1100, and formed by reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

19. A paint in accordance with claim 9 wherein an amount up to but less than 50% of said divinyl compound is replaced with a different divinyl compound consisting essentially of carbon, hydrogen and oxygen, having a molecular weight in the range of about 220 to about 650, and being formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

20. In a method for painting a substrate wherein a film-forming solution is applied as a paint film to a surface of said substrate and crosslinked thereon by exposing the coated surface to ionizing radiation, the improvement wherein said film-forming solution, exclusive of non-polymerizable solvents, pigments and particulate mineral filler, consists essentially of about 20 to about 90 parts by weight monovinyl monomers and about 10 to about 80 parts by weight of a divinyl compound formed by first reacting one molar part of a monoepoxide with one molar part of an alpha-beta olefinically unsaturated monocarboxylic acid selected from acrylic acid and methacrylic acid and subsequently reacting the resultant monovinyl ester condensation product with one molar part of a vinyl unsaturated acyl halide.

21. An article of manufacture comprising in combination a substrate and a polymerized coating of paint formed upon an external surface thereof by applying to said surface a film of substantially even depth of a film-forming solution which, exclusive of nonpolymerizable solvents, pigments and particulate mineral filler, consists essentially of about 20 to about 90 parts by weight monovinyl monomers and about 10 to about 80 parts by weight of a divinyl compound formed by first reacting one molar part of a monoepoxide with one molar part of an alpha-beta olefinically unsautrated monocarboxylic acid selected from acrylic and methacrylic acid and subsequently reacting the resultant monovinyl ester condensation product with one molar part of a vinyl unsaturated acyl halide.

References Cited

UNITED STATES PATENTS 3,466,259    9/1969    Jernisan _____ 260—836X

FOREIGN PATENTS 1,006,587    10/1965    Great Britain _____ 260—486

ALFRED L. LEAVITT, Primary Examiner

J. H. NEWSOME, Assistant Examiner

U.S. Cl. X.R.

117—138.8, 161; 204—159.15, 159.16; 260—410.6, 475, 485, 486, 835, 836, 857